United States Patent
Jones et al.

(10) Patent No.: US 6,425,119 B1
(45) Date of Patent: Jul. 23, 2002

(54) METHOD TO PRODUCE APPLICATION ORIENTED LANGUAGES

(75) Inventors: Mark A. Jones, New Providence; Lloyd H. Nakatani, Westfield, both of NJ (US)

(73) Assignees: AT&T Corp, New York, NY (US); Lucent Technologies, New Providence, NJ (US)

(*) Notice: Subject to any disclaimer, the term of this patent is extended or adjusted under 35 U.S.C. 154(b) by 0 days.

(21) Appl. No.: 09/284,204
(22) PCT Filed: Oct. 9, 1997
(86) PCT No.: PCT/US97/17915
§ 371 (c)(1), (2), (4) Date: Apr. 9, 1999
(87) PCT Pub. No.: WO98/15894
PCT Pub. Date: Apr. 16, 1998

Related U.S. Application Data

(60) Provisional application No. 60/028,253, filed on Oct. 9, 1996.

(51) Int. Cl.$^7$ .................................................. G06F 9/44
(52) U.S. Cl. ........................................ 717/100; 717/114
(58) Field of Search ................................ 717/1, 2, 3, 4, 717/100, 104, 106, 114, 124; 707/500; 704/1, 2, 8, 9

(56) References Cited

U.S. PATENT DOCUMENTS

| | | | |
|---|---|---|---|
| 5,991,803 A | * 11/1999 | Glitho et al. | ................ 709/220 |
| 6,083,276 A | * 7/2000 | Davidson et al. | ............... 717/1 |
| 6,158,044 A | * 12/2000 | Tibbetts | ......................... 717/1 |
| 6,257,774 B1 | * 7/2001 | Stack | ......................... 395/705 |

OTHER PUBLICATIONS

Feldman, "NEw languages rom old: The extension of programming languages by embedding, with a case study", ACM, 1976, pp 237–242.*

Zave, "Domain understanding and the software process", IEEE, 1990, pp 145–147.*

Ardis et al., "Defining families: THe commonality analysis", Software Engineering, IEEE, 1997, pp 649–650.*

Kristensen et al., "Specification and implementation of application–oriented languages", System Sciences, IEEE, 1990, pp 55–63.*

Ladd et al., "A*:A language for implementing language processors", IEEE, May 1997, pp 894–901.*

* cited by examiner

*Primary Examiner*—Kakali Chaki

(57) ABSTRACT

Jargons are a family of application oriented languages well-suited for representing and processing complex, hierarchically structured information. A system is presented that automates most of the work of making a jargon, so practically any programmer can make a simple one in a few days. Every jargon has the same syntax, is processed with same ready-made base interpreter, and comes complete with a suite of "deluxe" features: debugger, error handler, function definition, associative arrays, variables, incremental loader, among others. The system provides a general purpose programming language for writing actions that defines the semantics of a jargon and an interpreter written in the general purpose language and customized for the jargon, by integrating the jargon's actions into the interpreter. Using jargons, the same information document may be reprocessed to generate a multiplicity of products.

16 Claims, 2 Drawing Sheets

METHOD TO PRODUCE APPLICATION ORIENTED LANGUAGES

This application claims priority from U.S. Provisional Application Serial No. 60/028,253 filed Oct. 9, 1996.

FIELD OF THE INVENTION

The invention is directed to the field of computer methods to produce application oriented languages.

BACKGROUND OF THE INVENTION

An application-oriented language (AOL)—what Bentley (1089) calls a "little language"—is a good way to solve many a problem. An AOL "knows" the nitty gritty and steps needed to solve problems in an application domain, and applies its knowledge automatically as a document written in the language is processed. An AOL frees us to deal with a problem at a higher level of abstraction, and relieves us to the mindless drudgery that is often the cause of errors.

Unfortunately, it takes a lot of expertise and effort to make an AOL. Although tools such as lex (Lesk & Schmidt, 1990), yacc (Johnson & Sethi, 1990), and MetaTool (Cleveland & Kintala, 1988) help, they are no panacea and no substitute for expertise in the art and science of designing and implementiing programming languages. This puts AOLs out of the reach of most domain experts who have the need for them but lack the skills to make their own. If domain experts could make little languages easily, more of their potential to enhance productivity would be realized.

To save on the effort of making an AOL, certain features are often left out; the result is a compromised and less effective AOL. For example, a typical AOL doesn't have a debugger, can't be easily extended or customized by its users, lacks scoped variables and data structures, and lacks parameterized functions. The cost of putting these features into an AOL is usually prohibitive given the limited use of each individual language. The hidden cost is that, as users, we must suffer an inadequate AOL over the long haul.

Like many good things in life, too many AOLs may be bad. As they proliferate and our use is spread thinner and thinner over more and more AOLs, we find it harder and harder to achieve mastery of any one, and thend to forget those we use rarely. Their proliferation also creates application "islands" that can't talk to each other. The AOLs that fafcilitate problem solving in their respective domains become barriers for solving large problem spanning multiple domains and requiring communication and coordination among partial solutions written iin different languages. Although people can be multilingual, AOL compilers and interpreters are decidedly monolingual. So we end up with many AOLs that can't work together.

We propose here a way to reap the benefits of AOLs without incurring many of their costs. The proposal is that AOLs be realized as jargons. Jargons are a family of AOLs that share many features in common, and are distinguished only by the expressions they contain, just like jargons of a natural language like English. The syntax, execution semantics, and other features that jargons share make them easy to learn and remember, and also make it possible to combine different jargons into a new, hybrid jargon capable of solving bigger problems.

We also present the infocentric paradigm and its realization by the Info Wiz system as an easy way to make a jargon. The infocentric paradigm enables someone with no expertise in programming language design and implementation to prototype a jargon in a day and finish it in a week. The infocentric paradigm represents a sea change in how we go about representing and processing information. The change comes about because InfoWiz makes it so easy to solve a problem indirectly by first making a jargon, and then using the jargon to represent the solution. This approach is called the infocentric paradigm, because it is centered on information modeling as the key to problem solving, in contrast to the conventional algocentric paradigm that is centered on modeling algorithms or procedures.

The infocentric paradigm makes information reuse practical. Iinformation reuse is realized when an AOL document (i.e., "program") is kept fixed, but the semantics of the expressions of the jargon are changed on each processing of the document in order to generate different products. This aspect of the infocentric paradigm shows that an Info Wiz document is really a program, but not of the familiar kind. Unlike conventional programs whose free parameters are vairables that take on different data values, the free parameters of an Info Wiz document are expressions that take on different semantics with each distinct reuse.

The original inspiration for Info Wiz was Sharon Murrel's monk text formatting system (Murrel & Kowalski, 1984). Monk introduced the important idea of using a high-level programming language for writing actions that was different from the base language.

following is a bibliography of prior aork in the field of the invenion:

Anonymous, MetaTool Specification-Driven-Tool Builder. North Andover, Mass.: AT&T Bell Laboratories, 1990.

Bentley, J. L. Little Languages for Pictures in Awk. AT&T Technical journal, July–August 1989,,p..

Cleveland, J. C. & Kintala, C. Tools for Building Application Generators. AT&T Technical Journal, July–August 1988,,p..

Devanbu, P. GENOA—*A Customizable, Language- and Front-End Independent Code Analyzer.* AT&TBell Laboratories Memorandum 11262-910816-22TM, Aug. 16, 1991.

Emerson, S. L. & Paulsell, K. Troff Typsetting for Unix System. Englewood Cliffs: Prentice Hall, 1987.

Goldfarb, C. F. *The SGML Handbook.* Oxford, England: Clarendon Press, 1990.

Greer, R. & Belanger, D. G. *backtalk: A Text Generator, Tree Manipulator and Macro Processor.* AT&T Bell Laboratories Memorandum 112687-931115-18-TMS, Nov. 15, 1993.

Johnson, S. C. & Sethi, R. yacc: *A Parser Generator.* Anonymous (Ed.) *Unix Research System Papers. Tenth Edition.* Murray Hill, N.J.: AT&T Bell Laboratories, 1990.

Knuth, D. E. *The TEXbook.* Reading, Mass.: Addison-Wesley, 1984.

Ladd, D. A. & Ramming, J. C. A*:*a Language for Implementing Language Processors.* AT&T Bell Laboratories Memorandum BL0112650-930924-17-TM, Sep. 24, 1993.

Lesk, M. E. & Schmidt, E. Lex—*A Lexical Analyzer Generator.* Anonymous (Ed.) *Unix Research System Papers, Tenth Edition,* Murray Hill, N.J.: AT&T Bell Laboratories 1990.

Murrel, S. L. & Kowalski, T. J. *Overview of Monk 0.2: Typographical Database.* AT&T Bell Laboratories Memorandum 11229-841210-12TMS, Dec. 10, 1984.

Nakatani, L. H. & Ruedisueli, L. W. *FIT Programming Language.* Murray Hill, N.J.: AT&T Bell Laboratories, 1991.

Nakatan.. L. H. & Ruedisueli, L. W. *FIT Programming Language Primer.* AT&T Bell Laboratories Memorandum 11264-920301-03TMS, Mar. 1, 1992.

Ousterhout, J. K. *Tcl and the Tk Toolkit.* Reading, Mass.: Addison-Wesley, 1994.

Reid, B. K. A High-Level Approach to Computer Document Formatting. In *Proceedings of Seventh Annual ACM Conference on Principles of Programming Languages,* New York: ACM, 1980.

SUMMARY OF THE INVENTION

Jargons are a family of application-oriented languages well-suited for representing a processing complex, hierarchically structures information. A system is presented that automates most of the work of making a jargon, so practically any programmer can make a simple one in a few days. Every jargon has the same syntax, is processed with same ready-made base interpreter, and comes complete with a suite of "deluxe" features: debugger, error handler, function definition, associative arrays, varibles, incremental loader, among others. The application-oriented and declarative nature of jargons make them usable by domain experts who are no programmers. The commonalities among all jargons, especially their syntax, make them easy to learn and remember, and make it possible to combine different jargons to solve bigger problems. Jargons facilitate information reuse, whereby the same information document is repocessed to generate multiplocity of products.

One aspect of the invention is a method for automatically producing an application-oriented language for processing hierarchically structured information. The method comprises the steps of:

providing a general-purpose information language for writing expressions associated with a domain of application;

providing a general-purpose programming language for writing actions to be executed on said expressions;

providing an interpreter written in said general-purpose programming language for interpreting documents written with said expressions and actions; and making an application oriented language that is a member of a family of programming languages that share a common syntax, but differs in its expressions and actions, depending on the domain of application.

DISCUSSION OF THE PREFERRED EMBODIMENT

Figure 1:
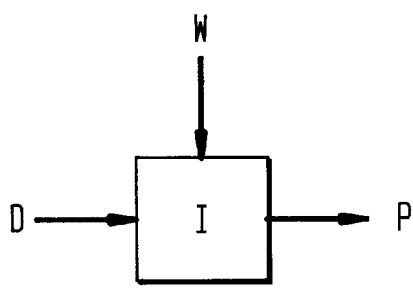
FIG. 1 shows the simplest processing of a jargon document. Interpreter I integrates wizer W to process document D to produce product P.
Figure 2:
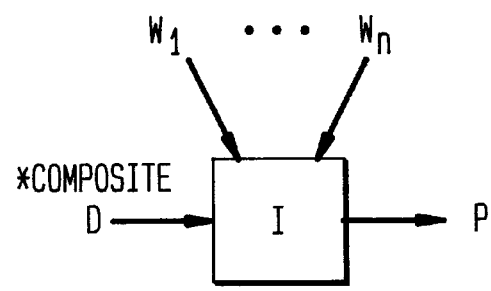
FIG. 2 shows the collaboration (teamwork) among different jargons. Interpreter I integrates wizers W(1) through W(n) to process document D written in jargons J[1] through J[n] to produce product P.
Figure 3:
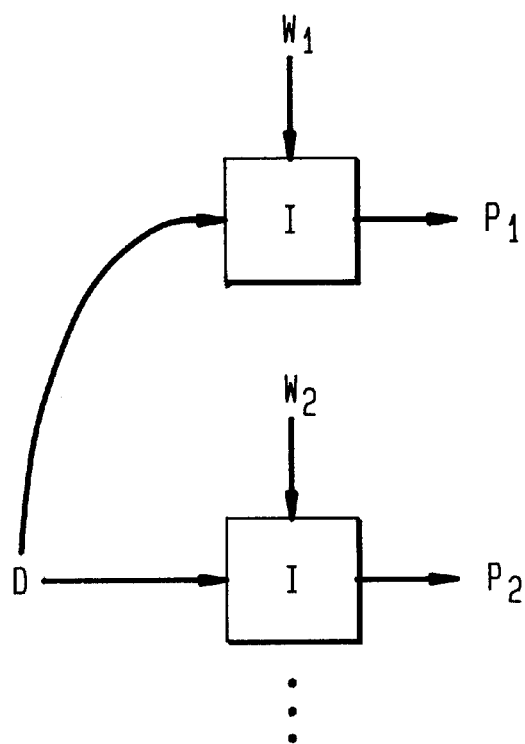
FIG. 3 shows information reuse, in which a multiplicity of products are produced from a single document. Interpreter I integrates wizer W[1] to process document D to produce product P[1], another instance of interpreter I integrates wizer W[2] to process document D to produce product P[2], and so for other products.
Figure 4:
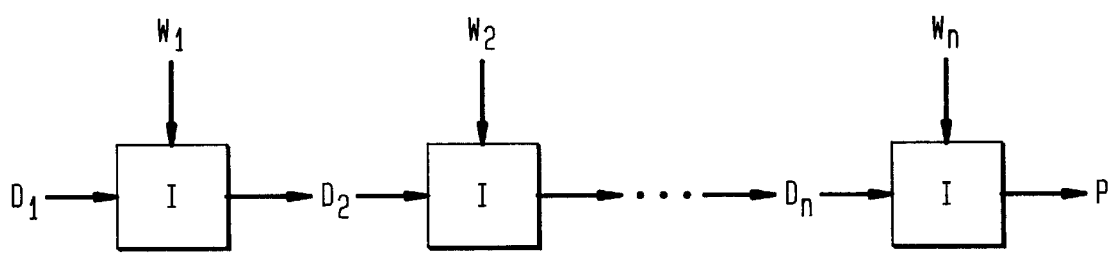
FIG. 4 shows a processing chain with intermediate results passed as documents. Interpreter I integrates wizer W[1] to process document D[1] to product document D[2]. Another instance of interpreter I subsequently integrates wizer W[2] to process document D[2] to produce a document, and so on. Finally, yet another instance of interpreter I integrates wizer W[n] to process document D[n] in the last step of the chain to produce product P.
Figure 5:
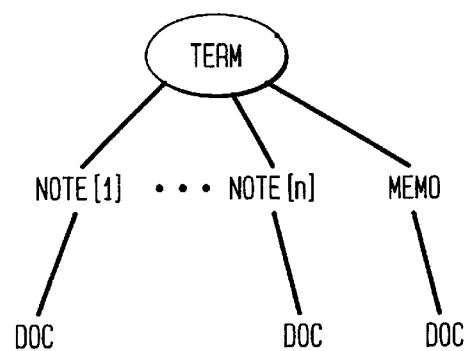
FIG. 5 shows an internal representation of a document in Info Wiz.

Many kinds of jargons can be made with the invention. We show two examples: the first is a conventional procedural programming jargon for representing procedures or algorithms, and the second is a declarative markup jargon for representing the structure of a letter. The first has a procedural flavor, while the second has a declarative flavor.

None of the expressions in the examples to follow are intrinsic to the jargons made with InfoWiz. That is the essence of InfoWiz: the freedom and obligation to decide for yourself the jargon's expressions and their semantics. InfoWiz prescribes only the syntax of the expressions. You make a jargon by coining expressions appropriate for representing problems in the jargon's domain, and writing actions that define the semantics of those expressions. Actions are functions written in a high-level programming language. In practice, the words of a natural jargon for a domain are inspirations for the expressions of an artificial jargon. The correspondence between the two explains why a well-designed artificial jargon seems like a "natural" for a domain. ***X Procedural Jargon A jargon for representing a procedure resembles a procedural programming language. Here's a program for a simple game written in a procedural jargon that looks like C with statements that begin instead of end with ; (the markup jargon to follow will make clear the need the for ; prefix). The program has variables, does input and output, loops with a while expression, and branches with if-else expressions. Indentation is syntactically significant, and is used to indicate the hierarchical structure of the program.

```
;=secret[;random(100)]
;output
   I've picked a number between 1 and 100.
   Can you guess the number?
;while(*T*)
   ;=guess(;input[Your guess: ]]
   ;if( ˆ[qQ]$ ~ ;.guess )
      ;leav••
   else
      ;if( .secret == ;.guess )
         ;output(Congratulation!]
         ;leave
      ;else( ;.secret < ;.guess )
         ;output[Smaller]
      ;else( ;.secret > ;.guess )
         ;output[Bigger]
```

The syntax for setting and getting the value of a variable is a bit unusual. The secret variable is set to the value of the random function by ;=secret[;random(100)]

and the value of the variable is gotten by ;. secret.

The expressions inside the parentheses of the if and else expressions are various predicates: ~ is a regular expression pattern match predicate; ==. <, and > are the usual relational predicates for numbers. The infix notation for the binary predicate operators is syntactic sugar to make the predicates more readable.

When the document representing the program is processed with an interpreter customized for the procedural jargon, the document is "run" to play the following game (user input is in bold):

I've picked a number between 1 and 100.
Can you guess the number?
Your guess: 50
Bigger
Your guess: 75
Bigger
Your guess: 88
Bigger
Your guess: 94
Bigger
Your guess: 97
Smaller
Your guess: 95
Congratulation!

This example shows that a jargon for representing procedures looks and behaves like a conventional procedural programming language. But jargons intended for other purposes look very different, as we see in the next example.

Text Markup Jargon

A jargon for representing the high-level semantic structure of a text document resembles a text formatting markup language like troff (Emerson & Paulsell, 1987)., Scribe (Read, 1980), LaTex (Knuth, 1984), and SGML (Goldfarb, 1990). Here's a simple letter marked up using the markup jargon:

; date [September 8, 1994]
; from
    Dr. Lloyd Nakatani
    AT&T Bell Laboratories
    Murray Hill, NJ 07974
; to
    Dr. David Barter
    School of Technology
    Evergreen College
    Evergreen CO 80800
Dear Dr. Barter:
Thank you for your interest in ;i[InfoWiz]. With ;i[InfoWiz], you can easily make a new ;i[jargon] by following these steps:
;list(c)
  1. Model the information structure using jargon terms
  2. Write actions defining the meaning of the jargon terms
  3. Make a jargon interpreter incorporating the actions
Then the end-user can process information by following these steps:
; list (c)
  1. Using the jargon, a document representing the information to process
  2. Process the document with the interpreter
You will find that ;i[Info Wiz] makes it easy to create customized information processing applications that end-users find easy to use.
; closing (Sincerely) [Lloyd Nakatani]

Notice that an expression may occur in the middle of plaintext, which is ordinary text that is not an expression of the jargon; an example from the letter is Thank you for your interest in ; i[InfoWiz].

The leading ; distinguishes an expression from its surrounding plaintext. This syntactic feature of jargons made with InfoWiz permits the commingling of expressions and plaintext, and makes possible a text markup jargon.

When the letter document is processed with an interpreter customized for the markup jargon, and the resulting output—or product—is sent to a printer, we get the following version of the letter:

---

January 2, 1995

Dr. Lloyd Nakatani
AT&T Bell Laboratories
Murray Hill, NJ 07974

Dr. David Barter
School of Technology
Evergreen College
Evergreen, CO 80800

Dear Dr. Barter:

---

Thank you for your interest in InfoWiz. With InfoWiz, you can easily make a new jargon by following these steps:
  1. Model the information structure wing using jargon terms
  2. Write actions defining the meaning of the jargon terms
  3. Make a jargon interpreter incorporating the actions
Then the end-user can process information by following these steps:
  1. Using the jargon, write a document representing the information to process
  2. Process the jargon with the interpreter
You will find the InfoWiz makes it easy to create customized information processing applications that end-users find easy to use.
Sincerely,
Lloyd Nakatani The procedural and markup jargons share no expression in common. This is typical. Each jargon is characterized by expressions that make it uniquely suited to the problems in its domain, and simultaneously make it unsuited to problems in domains covered by other jargons. Later, we'll see how several jargons can be pooled to make hybrid jargons that address problems spanning multiple domains.

InfoWiz System for Making Jargons

The InfoWiz system for making a jargon comprises three components:
the WizTalk information language is a general-purpose language for modeling complex, hierarchically structured information;
the FIT programming language is a language for writing actions that define the semantics of the expressions of a jargon; and
the Wiz base interpreter is a genetic interpreter for WizTalk that is customized into a specialized interpreter for a particular jargon by integrating the jargon's action into Wiz.

WizTalk General-Purpose Information Language

WizTalk is a general-purpose information language that is the base language of all the artificial jargons made with InfoWiz, just as English, French or any other natural language is the base language of its natural jargons that experts speak to each other. The syntax of WizTalk is the syntax of every jargon. However, WizTalk has no expression with application-specific semantics, so for the purpose of making a jargon, WizTalk is effectively a tabula rasa. It is only by extending WizTalk with application-oriented expressions that it becomes a jargon capable of representing solutions for a particular domain.

The syntax of every WizTalk expression is essentially the same, but optional elements and variant forms create the impression of greater variety. The syntax of the simplest WizTalk expression is ;term[memo]

an inset memo indented with a tab

; term
memo or a block memo

; term[
memo
]

The terminating ] of an expressions's block memo is vertically aligned with its marker. Multiline memos are more readable in either inset or block form. A memo may contain nested WizTalk expressions.

An expression may have one or more notes. In the syntax, the notes of an expression follow its term, precede its memo (if any), are enclosed, in parentheses, and are separated by | when there are two or more notes:

; term(note$_1$ | . . . | note$_n$) [memo]

How many notes a particular expression may have—none, one, two, or a variable number—depends on its semantics as defined by its action. Notes are stripped of leading and trailing whitespaces. A note may contain nested WizTalk expressions.

Because a WizTalk expression can have both a note and a memo, it is capable of expressing procedural programming constructs such as ;if( :.secret == ;.guess )
  ;output[Congratulation!]
  ;leave
else( ;.secret < ;.guess )
  ;output[Smaller]
;else( ;.secret > ;.guess )
  ;output[Bigger]

where the notes of the if and else expressions are predicates, and their memos specify the processing steps to take when the predicates are true.

The special symbols of WizTalk's concrete syntax can be changed to suit personal taste, or to avoid clashes between WizTalk's special characteristics and verbatim characters of the information. For example, the marker is changed to . and the note separator to a , by ;wiztalk[.term(note,note)[memo]]

WizTalk comes with about three dozen base expressions that are generic to many jargons, and best provided once and for all in the base language. Some examples of base expressions are the comment expression ; " [This is a comment]

to put comments in a document, and the ! verbatim expression

;![This is verbatim information that should not be processed]

to quote verbatim information that should not be processed. The # expression evaluates the arithmetic expression in its memo ; # [ 3* (; .x - 10) ]

to compute a number. The define expression (we'll see an example later) lets us define a new expression in terms of existing expressions to customize and extend a jargon.

FIT Programming Language and Environment

The FIT programming language (Nakatani & Ruedisueli, 1991, 1992) is a high-level, general-purpose, interpreted programming language that is used in InfoWiz for writing actions that define the semantics of the expressions of a jargon. A high-level programming language is more powerful and flexible than a macro language, and easier to use than a low-level language like C. It's an important feature of InfoWiz that the WizTalk information language is not doing double-duty as a macro language for defining actions. In our view, a language well-suited to representing information is not well-suited to defining actions. Hence the need for both WizTalk and FIT.

Here is an example of a simple action:

A_uc
  WizOut UpperCase GetWizMemo

With this semantics for the uc expression, processing the ;uc[infowiz] expression yields INFOWIZ. The A_ prefix signifies that this FIT function is an action, and the uc portion of the function name links this action to the uc expression. InfoWiz comes with a library of API (Application Programming Interface) functions written in FIT for interfacing with the Wiz interpreter, which is also written in FIT. The GetizMemo API function gets and processes the expression's memo, and returns the product. UpperCase is a FIT general-purpose library function that converts text to upper case. The WizOut API function appends its argument to the output buffer where Wiz accumulates the products of expressions. The output buffer serves as a conduit for passing the results of nested child expressions to their parent expression.

Wiz Generic Interpreter

Wiz is the base interpreter for WizTalk that is customized for a jargon by integrating (automatically) the jargon's actions into the interpreter. Wiz parses a Wiz Talk document to produce a parse tree with nodes corresponding to the WizTalk expressions, and does a depth-first, left-to-right traversal of the tree, executing the action associated with the expression at each node. Each action controls the evaluation of the nested expressions in its notes and memo, so how deeply a branch is traversed depends entirely on the actions. Wiz merely caries out the intent of the actions. In other words, evaluation is top-down rather than bottom-up, as is typical of most programming languages. However, data flow is bottom-up, where the bottom is not necessarily the leaves of a branch, but the depth to which an action traverses its subtree. The ability of actions to dictate the evaluation strategy is essential for realizing the semantics of some kinds of jargons. In the procedural jargon, for example, the action of an if expression must evaluate its memo only if the predicate in its note evaluates to true. This semantics can be realized only when the action dictates.

Infocentric Paradigm

The infocentric paradigm for processing information involves (a) creating a jargon to model the information using domain terminology and relationships, (b) developing tasks by programming coordinated sets of actions, and (c) using jargons to write and process documents. The roles of jargon creator, task developer, and jargon user may be filled by a single individual, or by different individuals. The jargon creator is a domain expert, the task developer is a programmer, and the jargon user is a domain worker who need not be a programmer. The following discussion demonstrates the steps in making and using a jargon to produce banners like this:

```
===============================
|  ***  I N F O W I Z  ***  |
===============================
```

Jargon Creators

A jargon creator must first analyze the domain to come up with a model for representing information for that domain.

The model should be abstract and not tied to any particular problem, so that a jargon based on the model is capable of representing solutions not only for known problems, but also for future problems not yet imagined. The goal is to make a jargon for writing documents that can be reused to solve not only known problems, but also unanticipated problems when they arise. The more abstract the jargon, the greater the leeway in interpreting expressions, and the greater is the possibility of information reuse.

The information model makes its inspiration from the natural jargon that domain experts use to talk about things, concepts, and operations. The presumption is that, in many cases, the appropriate model already exists, and is implicit in the natural jargons that flourish in nearly every area of human endeavor. Pipe-fitters, cross-stitchers, and computer scientists, to mention just a few, all speak in well-established, but evolving, natural jargons. By following the natural jargon of a domain, an artificial jargon will give its users a head start.

For the banner example, we model the banner as a product of three primitive operations. The first operation brackets the message with stars. This operation is represented by this expression ;star[INFOWIZ]

which will produce

* INFOWIZ *.

The second operation frames the message. This operation is represented by

;frame[INFOWIZ]

which will produce

```
=======================
/      INFOWIZ       /
=======================
```

The final operation expands a message by inserting a blank space between its letters. This operation is represented by ;expand[INFOWIZ]

which will produce

I N F O W I Z

Task Developers

Each possible type of document reuse corresponds to a new task. A task developer specifics a task by defining the semantics of the jargon expressions. In InfoWiz' this is done by defining actions as functions in the FIT programming language. Each action processes the information in the notes and memo of its expression. Here are some actions for the task of displaying a banner written in the banner jargon:

```
#--------------------------- Put *** before and after message
A_star
    WizOut ****    * (GetWizMemo) *     ****
#--------------------------------------------- Frame the message
A_frame
    Set msg GetWizMemo
    Set top_bottom<Thru 1 $msg+10> "="
    WizOut top_bottom "\n"
    WizOut "/" (Frame / "C" / $msg+8 msg) "/\n"
    WizOut top_bottom "\n"
#--------------------------- Put blank space between each letter of
    Message
A_expand
    WizOut / "  " / (Cut 1 GetWizMemo) [ ]
```

This is all the programming necessary to implement the display task. No code need be written to integrate the actions into the Wiz interpreter, because the integration is automatic, as we will see shortly.

The module file containing the definitions of actions and other supporting functions, if any, is called a wizer. Specifically, the three actions for the display task with the banner jargon are in the wizer named banner.w.

An interpreter for a particular jargon and task is made by integrating the actions into the Wiz base interpreter. This is done simply by compiling together the Wiz interpreter with the wizer containing the action definitions as follows:

$ fit wiz.t banner.w -o banner

The fit command runs the FIT interpreter to compile the wiz.t module file defining the Wiz interpreter together with banner.w wizer defining the three actions. The -o option specifies that the byte-code object produced by the compilation be written to the banner file, which becomes the command that runs the interpreter for displaying a banner. The actions are automatically integrated into the base interpreter to produce a variant of the interpreter that is customized for the display task on the banner jargon.

As new uses for old documents arise, task developers will have the on-going job of writing new actions to generate different products from existing documents. Later, we will present examples of several different wizers which implement different tasks for the same jargon. An alternative to writing actions is to have a program generate them automatically from a specification. We have programmed a query utility, for example, that takes a tree query (a hierarchical path expression and a frontier regular expression) and generates a set of actions which implements the query. Such queries can be issued over any WizTalk document in any jargon. Nonetheless, we don't have enough experience with automatic generation of actions to know whether non-programmers can be task developers for an interesting range of useful tasks.

Jargon Users

The jargon users in the infocentric programs write documents in a jargon and process those documents to generate various products. We choose to call it a document instead of a program, because it often looks more like a description of information than a program written in a conventional programming language. The neutral terminology is less likely to prejudice us to see it as either information or program. This document in file banner.doc ;frame[;expand[;star[INFOWIZ]]]

written the banner jargon will display the banner we want. Judging from this example, we surmise that the jargon user need not be a programmer in the usual sense, because a jargon lets the user, who is presumably familiar with the domain, model the information and operations in a familiar terminology. Furthermore, the high-level, declarative nature of a jargon, and its simple, uniform syntax should make it easier to learn and use than conventional programming languages. This conjecture is buttressed by the fact that most jargons look like a markup language, which we know non-programmers are capable of using, judging from experience with markup languages such as troff and LaTex.

Writing a document in a more procedural jargons, such as the one for the guessing game example seen earlier, will feel more like programming. As a special case, a programming language can be viewed as a jargon intended for specifying procedures, and its users must be programmers. The notion that jargon-usage can shade into programming raises an interesting question about the skills required for jargon users in general. In using a text formatting jargon, the user is effectively programming without possibly realizing it, even though the task entails the ordering and composing jargon expressions, just like programming. LaTex and HTML show that non-programmers can manage programming at the level of text formatting jargons. In its full glory, programming is more complex than text formatting, because the programmer must take into account many relationships among statements besides order arid composition, such as variable assignment, conditional execution, and non-sequential control flow. The resulting complexity makes programming (and understanding programs) notoriously difficult. Jargons which reflect a high degree of procedurality will generally require greater programming skill of its users than those which represent information more declaratively.

A document written in a jargon is processed with the appropriate interpreter to generate the desired product. The banner document in banner.doc is processed with the banner interpreter made earlier to display a banner written in the banner jargon. The following command does the processing:

$ banner banner.doc

The result is this product written to the standard output:

```
=============================:
/  ***    INFOWIZ   ***    /
=============================:
```

Processing a document is equivalent to running a program: as before, the neutral terminology is less prejudicial.

Benefits of Jargons

Jargons and the infocentric paradigm provide numerous benefits for information processing compared to the usual ways of malting an AOL and processing information. They can be summarized by Easier, faster, better."

Jargons are Easy to USE

Jargons can improve productivity dramatically if the power of programming is put in the hands of people who are not programmers, and they are able to automate the work they now do manually. By comparison productivity will improve only marginally if jargons succeed merely in speeding up the work of relatively few skilled programmers who are already into automation. For this promise to be realized, jargons must be easy enough for non-programmers to use.

As a demonstration of what is possible for a non-trivial task, the survey jargon shown below should enable someone who is skilled in the design and construction of surveys but who is not a programmer to write a survey document that administers the survey automatically. Here is a survey on ice cream preferences written in the survey jargon:

```
; frame (start)
   ;message [This is a survey about ice cream]
   ;next [like]
; frame (like)
   ; message [Do you like ice cream?]
   ; prompt (;yes.no) [Type yes or no]
   ; next (yes) [flavor]
   ; next (no) [done]
; frame (flavor)
   ; message [What is your favorite flavors>]
   ; menu (scramble)
      Vanilla
      Chocolate
      Strawberry
   ; next (Vanilla) [vanilla_kind]
   ; next [brand]
; frame (vanilla_kind
   ; message [What kind of vanilla?]
   ; menu
      Plain
      Vanilla bean
```
```
      ; next [brand]
   ; frame (brand)
      ; message [What is your favorite brand of: flavor.choice?]
      prompt [Type the name of the brand]
      ; next [done]
   ; frame (done)
      ; message [Thank you]
   ; finish
```

The yes.no expression in the note of the prompt expression of the like frame constrains the response to be either yes or no. The memo of the next expression specifies the next frame to administer when the response on the current frame matches the note of the expression. The flavor.choice variable in the prompt of the brand frame is automatically set to the chosen flavor by the menu expression in the flavor frame.

Although the survey looks more like a description than a program, it can be administered automatically when processed with appropriate actions supplied by the jargon developer, as this session illustrates:

```
This is a survey about ice cream
Do you like ice cream?
   Type yes or no→yes
What is your favorite flavor?
   1—Vanilla
   2—Chocolate
   3—Strawberry
   Type the number of your choice→1
What kind of vanilla?
   1—Plain
   2—Vanilla bean
   Type the number of your choice→2
What is your favorite brand of Vanilla?
   Type the name of the brand→YumYum
Thank you
```

Certain features of jargons should contribute to their ease of use. The terms of expressions reflect, ideally, the natural terminology of the domain, and should thereby tap into existing knowledge via a familiar vocabulary. The information in an expression is labeled by its term, and the composition of the expressions serves to arrange the information into a familiar pattern. The above points are illustrated by this document sample:

```
;employee
   ;name
      ;first [Joe]
      ;last [Martino]
   ;address
      ;loc[MH]
      ;room[2B-654]
   ;phone
      ;office[908/555-4321]
      ;fax[908/555-7654]
```

Notice how the indentation of inset memos makes the hierarchical structure of the information readily apparent to the eye. More generally, the WizTalk syntax should be easy to learn and use, because every expression has the same, simple syntax. Yet the syntax, despite its simplicity, is capable of representing diverse kinds of information ranging from a procedure for a game, a letter marked up for formatting, and the hierarchical structure of a survey, as we've seen so far. Most jargons tend to be declarative—as opposed to the procedural—in character, thereby making a document seem less like a description of an algorithm and more lilts a statement of facts. That is, a declarative jargon says what but not how. The menu expression in the survey, for example, only says what the choices are, and nothing about how they are presented or how a choice is made. Experience with text formatting markup languages such as troff and LaTex shows that Non-programmers can use declarative languages, and by extension, declarative jargons. However, we expect that only programmers can use a procedural jargon like the one for the number guessing game.

Jargons are Easy to Learn and Remember

If jargons are easy to make, users face the possibility of having to learn and remember a different jargon for each application. If jargons were like conventional AOLs, this would be a significant problem because learning the different AOLs is akin to learning French to talk about cooling, Chinese to talk about philosophy, and Italian to talk about music. By contrast, learning different artificial jargons is akin to learning the natural jargons of cooking, philosophy, and music in a natural language we already speak. Having learned one artificial jargon, learning a new one is just a matter of "picking up" the expressions and their semantics. Of learning the "buzzwords" of a domain. The syntax, programming environment, idioms, pitfalls, and folklore gained through hard experience carries over from one artificial jargon to the next, because they are common to all jargons. Learn one, learn all.

The commonality between jargons forestalls forgetting, too. When using a conventional programming language, we get increasingly "out of practice" with all the others we know but are not using at the moment. By contrast, when we use any jargon, we continue to practice everything it shares in common with every other jargon. Practice one, practice all.

Jargons are Easy to Make

Jargons are easy to make because InfoWiz provides canned solutions for most of the tasks entailed in designing an dimplementing a programming language. The syntax of the jargon is prescribed by Wiz Talk, so the work of syntax design is eliminated. Wiz provides a parser for WizTalk, so the work of writing a grammar and parser is eliminated. The parse tree of a document is automatically traversed and actions automatically invoked, so programming of control flow is eliminated. The notes and memo of an expression are automatically made accessible to its action, so programming to supply the inputs to actions is eliminated. And the product of an action is accumulated in an output buffer, so programming to manage the outputs of actions is eliminated.

All that remains is to model the information, and to define the semantics of the expressions. Actions tend to be simple and easy to write, because each deals with only a small part of the problem, and usually have only local concerns. There is no need for high-level program design, because a wizer is just a collection of actions in one=to-one correspondence with their expressions. When the behavior of an expression requires modification or correction, this correspondence makes it easy to find the expression's action.

The FIT programming language contributes to the ease of writing actions. FIT has the power of C/C++ but is much easier to use, because FIT is a high-level, interpreted language with a rich assortment of data types including multidimensional associative arrays, objects, and sequences that unify the processing of strings, filed, and input/output. FIT comes standard with a large library of reusable functions, supplemented with API functions specifically for writing actions. FIT programs are typically one tenth the size of equivalent C programs, less prone to bugs because of automatic memory allocation and garbage collection, and are easier to debug. FIT's interactive interpreter and powerful debugging facilities make for a good programming environment. FIT's debugging environment is enhanced by options for the wiz command to set breakpoints and evoke the debugger in event of fatal errors. Debugging is further facilitated by the stop base expression for setting a breakpoint in an action, and the dump base expression for dumping the entire context at any point in processing a document.

Because FIT is a general purpose programming language, not a special-purpose macro language intended only for writing action code, it offers facilities for writing well-designed programs. FIT offers a choice of programming paradigms to suit the problem at hand, including imperative, functional, and objected-oriented programming paradigons. FIT comes standard with a library of over 250 reusable functions oriented toward text processing, and application-specific function libraries to support a domain can be built.

FIT runs on UNIX, PCS, and Macintoshes, so InfoWiz, which is written in FIT, also runs on those platforms.

Because a jargon is so easy to make, InfoWiz is useful for prototyping a computer language. Many alternatives for a language design can be explored at little cost, and the best alternative implemented using whatever technology is most appropriate as the final step. The syntax of WizTalk, because of its generality, may not be ideal for the final language, but it should be good enough for a prototype. By compromising on the syntax in the early going, the more important semantics issues can be explored without the distractions of syntax design issues. Once the substance of the language has been worked out, the syntax can be designed to suit.

Jargons are "Delux" AOLs

Jargons are not your stripped-down, bare-bones AOLs. Rather, jargons are "deluxe" AOLs with features seldom found even in mainstream programming languages like D/C++. Many of the features come as WizTalk base expressions that are standard in every jargon. A few of the features that go beyond the conventional are described below.

The parser in Wiz can be programmed with certain reader expressions. One is the WizTalk expression we saw earlier that changes the metacharacters of WizTalk's concrete syntax. Another is the binary expression ;binary(20)[<binary data>]

whose memo is 20 bytes of binary information that may contain any character, including metacharacters of the WizTalk syntax that would otherwise confuse the Wiz parser.

Several base expressions enable a document to control its own processing by dynamically loading actions. This wizer expression ;wizer (format)

dynamically loads the format wizer and uses the actions defined therein to process the document. Wizers can be grouped into packages with the package expression; for example ;package(report)[toc format index]

specifies that the report package is composed of the three wizers mentioned in its memo. This glossary expression ;glossary(/base/report)

dynamically loads the report package to augment the base expressions with the expressions defined in the package.

Wiz supplies a default proxy action for otherwise undefined expressions. The proxy action transforms an undefined expression into a field of a FIT record (associative array). For example, when this document ;name
  ;first[James]
  ;last[Smith]

is processed with this action

```
A__name
    Set n GetWiz Record
    WizOut n["last"]"," n["first"]"/n"
``` to produce

Smith, James the GetWizRecord API functions returns this FIT record

```
{
    first "James"
    Last "Smith"
}
``` representing the memo of the name expression. The record is the product of the proxy action, because the first and last expressions were undefined. In general, any portion of a document may be regarded as either data or program depending on which expressions are defined or undefined. This document duality makes for more flexible processing of documents. The jargon creator can define an action named A__default to override the default proxy action.

The define base expression defines a new expressions in terms of existing expressions. This is equivalent to defining new functions in a conventional programming language. For example, a banner expression to produce a particular style of banner is defined by

```
; define ( ; banner [msg])
    ; frame [; star [;.msg]]
``` in terms of the frame and star expressions we saw earlier. Similarly, a Roman expression to produce capitalized Roman numerals is defined by

```
; define ( ; Roman [a])
    ; uc [; roman [;a1]]
``` in terms of the us (for upper case) expression and the roman expression that converts an Arabic numeral into a Roman numeral. Given both definitions in source file mybanner.so, a wizer containing the banner and Roman actions is made by processing the source file with this command:

$ wiz mybanner.so>mybanner.w

These actions are incorporated into the banner interpreter we made earlier to make a new version of the interpreter:

$ fit banner mybanner.w -o my banner

Now a document with an expression such as

; banner [superbowl ; Roman [29]

is processed with the mybanner interpreter to produce this banner

```
==========================================
/   * * *      Superbowl XXIX      * * *    /
==========================================
```

The define expression enables someone who is a jargon user but not a FIT programmer to customize the jargon with new expressions.

Anyone who has developed an AOL in a conventional way knows that these deluxe features cost dearly in effort to provide. And because the effort can't be amortized over many AOLs, the benefits are often not considered worth the effort, to the detriment of the AOL and its users. By contrast, all of these features come for free in jargons made with InfoWiz. Jargon users may expect these features to be in every jargon, and to work the same way in all. Thus makes the features learning-free in that, once learned, they take no effort to learn for a new jargon.

Different Jargons Can Work Together

Unlike conventional AOLs, different jargons pan work together. Suppose that, working independently, Betty made jargon Alpha to produce a report, and Joe made jargon Beta for text formatting with multiple fonts in different sizes. Now suppose that Betty wants the report to be nicely formatted with headings in large letters and highlighted items in italic or bold face. Betty can make the needed hybrid jargon Gamma simply by pooling together Alpha and Beta. This is possible because Alpha and Beta have the same syntax, have a common interpreter, and the architectures of their action codes are identical. All jargons will share these features in common even when they are made independently. The interpreter for Gamma is made by compiling the wizers for both existing jargons with the Wiz interpreter:

$ fit wiz.t alpha.w beta.w -o gamma

Some work might be necessary to resolve incompatibilities, if any, between Alpha and Beta, but the work should be limited to changing the products of some actions. The one-to-one mapping between expressions and actions makes the relevant code easy to find.

By comparison, if Alpha and Beta were conventional AOLs, Gamma would have to be made almost from scratch. Alpha and Beta would in all probability have different syntaxes, so Alpha's interpreter would not understand Beta and vice versa. Perhaps the code for the semantics of Alpha and Beta could be salvaged and reused for Gamma, but this entails extracting the relevant code and resolving incompatibilites between them. This will probably take much effort, because the program architecture and data structures are likely to be incompatible between Alpha and Beta.

Jargons with certain characteristics are easy to pool. When all actions of the pooled jargons produce a common data type such as strings, then all expressions are compatible and can be freely composed. Text formatting jargons are examples of this case. Jargons are also easy to pool when only a small subset of the expressions of the pooled jargons are relevant to the hybrid jargon. In this situation, the irrelevant expressions are left undefined, so that a default action defined to do nothing is automatically evoked for all undefined expressions and causes the irrelevant expressions to be ignored.

Jargons Enable Information Reuse

InfoWiz enables information reuse. To appreciate the value of information reuse, consider the information repositories on the World Wide Web. A Web site might provide data on stock prices in a representation that graphs the data on our (the Web client's) display. If we want to do something else with the data, it will take hard work, if it is possible at all, to extract the data from its representation designed for only a particular, single use. The data is effectively locked in its representation and unavailable for reuse. However, if the data were a WizTalk document, we can display it as intended using a display wizer supplied with the data. More important, we are free to write our own actions to reuse the data for different purposes not envisioned by its supplier.

To show information reuse in practice, we will reuse this document that specifies the size and message of a sign:

```
;sign
    ;width[25] ;height[5]
    ;label[Hello world]
```

Information reuse with InfoWiz is a consequence of processing the same document with different wizers. When the sign document is processed with a wizer having "drawing" semantics for the four expressions in the document we get this picture of the sign:

With a wizer having "instructional" semantics, we get directions on how to make the sign:

```
================================
Materials and Costs for Sign
- - - - - - - - - - - - - -
25 x 5 poster board (125 sq. In. @ 0.05 cents/sq. In.)   $6.25
Message "Hello world" (11 letters @ 0.25/letter)         $2.75
================================
```

Finally, with a wizer having "SGML" semantics, we convert the WizTalk document into a SGML document:
<sign>
<width>25</width><height>5</height>
<label>Hello world</label>
</sign>

We have reused the sign document to generate four different products by processing it with four different wizers.

A more complex example of information reuse produces a printed version of the survey we saw earlier. When processed with a wizer having "print" semantics in lieu of the interactive administration semantics, the survey document produces this printed version:

```
This is a survey about ice cream.
 1. Do you like ice cream?
      ___ Yes
      ___ No
    If you answered "Yes," go to the next question.
    If you answered "No," skip to question 5.
 2. What is your favorite flavor?
      ___ Strawberry
      ___ Vanilla
      ___ Chocolate
    If you answered "Vanilla," go to the next question.
    Otherwise, skip to question 4.
 3. What kind of vanilla?
      ___ Plain
      ___ Vanilla bean
 4. What is your favorite brand favorite flavor?
       _____
 5. Thank you.
```

It is instructive to note that this reuse was not foreseen when the survey jargon was created and the ice cream survey document written.

Legacy information stands to benefit from translation into WizTalk, which "opens" the information for reuse. For example, we have written a program to translate electronic mail messages into WizTalk. The translation preserves all of the original characters including whitespaces, and the expressions and their organization make explicit the structure of the message (headers, body parts, fields within headers, and so on). We can reconstruct the original message by simply defining all expressions to evaluate to their memos. Message bodies may contain embedded WizTalk which can be executed to realize mail-enabled applications or active messages. Such messages can be scheduled for execution based on properties such as sender, subject and date.

Code reuse and information reuse are complementary aspects of program reuse. When the expression semantics of the program is kept fixed and the data changed for each execution, we have conventional code reuse. When the data (information) is kept fixed and the expression semantics changed with each execution processing), we have information reuse. In other words, the data variables are the free parameters in code reuse, whereas the expression semantics are the free parameters in information reuse.

Information reuse is easy with jargons, but hard with conventional programming languages. Information embedded in a program written in a conventional programming language can't be reused because the semantics of built-in expressions of the language can't be changed. For example, we can't generate different products from this fragment of C code if (x==0)
    printf (hello\n");
else
    printf("good bye\");

because we can't change the semantics of the if and else expressions. The only way we can reuse the information embedded in a C program is by writing cede analyzers. Examples of cede analyzers for C are its compiler, pretty-printer, profile, debugger, and code browser. But most programming languages are hard to parse, so reusing a program for novel purposes is difficult even for reasonably sophisticated programmers. Systems such as Genoa (Devanbu, 1991), which allow queries to execute on D/C++ parse trees are a limited response to this situation. In contrast, InfoWiz provides built-in parsing and interpretation services for any task, making it relatively easy to define new tasks. In addition, the common syntactic framework for documents across different domains makes it possible to implement generic tasks such as structure-sensitive searching which have applicability across domains and with different jargons.

The success of information reuse depends in large measure on the ease with which actions can be written, particularly by inexpert programmers. We are currently developing a graphical viewer for jargon documents analogous to spreadsheet programs for tabular data. In many domains, it may be possible to reuse a document by mapping a pre-defined set of actions to terms in the jargon.

SGML was the first to propose that information be represented in a way that made it suitable for reuse. The key difference between the SGML and InfoWiz is that InfoWiz comes with a ready-made interpreter for the WizTalk information language, whereas we must write our own for SGML. The consequence is that promise of SGML for information reuse has been hard to realize in practice, whereas information reuse is made a practical reality with InfoWiz.

WizTalk is a Lingua Franca for Information Exchange

WizTalk can serve as a lingua franca for information exchange. In our ideal vision of the future information world, any information that lends it self to representation in a jargon is so represented. The payoff is information that is easily exchanged, and usable for purposes that were not anticipated. Each new use extracts further value from the information. A lingua franca like Wiz Talk can be the basis for an "open information" society that treats information as a valuable commodity made even more valuable by its easy processability and reusability.

Many different kinds of information can be modeled in Wiz Talk, because there is practically nothing about WizTalk that stands in the way of the representation we desire. We can make up whatever expressions we want, compose them as we see fit, and define their semantics to suit. If any base expression gets in the way, it can be discarded or its semantics redefined.

The recipe shown below is a good example of the kind of complex, hierarchically structured information that can be represented in WizTalk:

| Date Bars | |
|---|---|
| (Serving: 24 bars) | |
| 2 eggs | 1 cup dates, cut into small pieces |
| 1 cup sugar | |
| 1 cup flour, sifted | ¾ cup walnuts. chopped |
| ¼ tsp salt | 1 tsp vanilla |
| 1 tsp baking powder | |
| 1. | Beat eggs until thick. Gradually beat in sugar. Sift together the flour, salt, and baking powder. Fold into the egg mixture. Add dates, nuts, and vanilla, folding in gently. |
| 2. | Spread in thin layer in 9" × 13" baking pan lightly greased inside. Bake in slow (300 degrees) oven 15 to 20 minutes. Cut into bars while warm. |
| 3. | Roll in confectioners' sugar if desired. For variety, leave some plain and sugar others. Store in a tightly closed container. |

The recipe consists of three major parts: general information (name and servings), a list of ingredients, and direction steps for preparation. Each ingredient in the list comprises a name and quantity, and the quantity in turn comprises a value and its unit. Each direction step is described by a short paragraph consisting of several lines.

The recipe is represented in a recipe jargon by the following document:
; name [Date Bars]
; serving [wr bars]
; ingredients
    ; 1 [; count [2]; item [eggs]]
    ; 2 [; measure [1 cup]; item [sugar]]
    ; 3 [; measure [1 cup]; item [flour, sifted[ ]
    ; 4 [; measure [¼ tsp]; item [salt]]
    ; 5 [; measure [1 tsp]; item [salt]]
    ; 6 [; measure [1 cup]; item [dates, cut into small pieces]]
    ; 7 [; measure [¾ cup]; item [walnuts, chopped]]
    ; 8 [; measure [1 tsp]; item [vanilla]]
; directions
    ; 1
    Beat eggs until thick. Gradually beat in sugar. Sift together the four, salt, and baking powder. Fold into the egg mixture. Add dates, huts, and vanilla, folding in gently.
    ;2
    Spread in thin layer in ;pan[9"×13" baking pan] lightly greased inside. Bake in slow (300 degrees) oven 15 to 20 minutes. Cut into bars while warm.
    ;3
    Roll inconfectioners' sugar if desired. For variety, leave so, plain and sugar others. Store in a tightly closed container.

An expression with a numerical term such as
;2[; measure [1 cup] ;item[sugar]]
represents an item in a list—in this example, a list of ingredients. The numerical term is the ordinal index of the item in the list.

The expressiveness of an information language like WizTalk has both a horizontal and vertical aspect. A language that is horizontally expressive is capable of representing information for many different kinds of applications. This is illustrated by WizTalk's ability to represent a procedure for playing a game, a letter marked up for formatting, a survey, and a recipe. A language that is vertically expressiveness is capable of representing all levels of information within a given application, from the top-level structure of a document down to the lowest-level expressions that apply to a single word—even a single character—in running text. Because WizTalk is vertically expressive, we can avoid a situation like this
;banner [Superbowl <Roman>29</Roman>]
where expressions in the middle of plaintext, such as the conversion from Arabic to Roman numeral, must be expressed in a different language, SGML in this example. By design, WizTalk is expressive both horizontally and vertically, so one information language suffices for representing information for diverse applications as well as for all levels of information within a single application.

Jargons Foster an Infocentric View of Information Processing

To solve an information processing problem with the infocentric paradigm, you first make a jargon and then use the jargon to represent the solution. That is, the information processing problem is viewed as essentially one of designing and implementing a programming language, which means that we can take a principled approach toward a solution rooted in the discipline of programming languages. Contrast this to the conventional paradigm for information processing: (1) design an and hoc "input format" and use it to represent the information; (2) design an ad hoc "output format," usually a human readable report, for the results; (3) write a program is to read and parse the information, process it, and write the results. Let's see what's wrong with this paradigm.

The input format usually suffers from these limitations: information can't be nested; information spanning multiple lines isn't allowed; information is not self-describing because it isn't labeled and its meaning depends on its position; information can't contain certain special characters; missing or extra information is an error. Even when the input format is well designed, certain problems are inescapable. The format is different from other applications, and requires learning and documentation. The format is likely to change as the limitations are encountered and overcome, and each change triggers a cascade of other problems: different versions of incompatible information, obsolescence of information pre-dating the change, programming to translate the old format to new format, updating programs dependent on the format whether or not they benefit from the change, and need for more learning and documentation. Most of these problems can be avoided by using an information language like WizTalk that is known beforehand to be capable of coping with the unforeseen complexity of an application.

The output format often suffers from one critical limitation; it's meant only for human consumption. Later, when another use for the output arises, relevant information might be hard to extract from the output, perhaps so hard that it reuse is impractical. This problem can be avoided if a jargon is designed as a filter that takes its own jargon as inputs, and outputs the results in another jargon. Then different products, including a human-readable report, are easily generated from the output document.

The program to process the information is likely to be bare-bones, with no debugging facilities, poor handling of exceptions and errors, no extensibility, and on and on. Even without these features, the program is likely to require significantly more code than the equivalent set of actions, and the code will be more complex because it has to deal with parsing the input, constructing data structures, and managing control and data flow. More complex code means more bugs, reduced comprehensibility, and costlier maintenance. By contrast, the action code for the infocentric paradigm is close to the minimum possible, because they need only define the semantics of the application. Anything beyond the application semantics is extra coding that the infocentric paradigm eliminates, along with all the problems that comes with the extra code.

The Scalability of Jargons, Documents and Tasks

Will a jargon scale gracefully as it increases in size and complexity? When a jargon grows to hundreds or even thousands of expressions, will it still be easy to deal with? Although we have little experience with jargons so big, features of the infocentric paradigm give us reasons to believe that infocentric paradigm for making jargons will scale well compared to other programming paradigms. In this section, we assess the scalability of jargons, documents and task definitions in InfoWiz.

The Scalability of Jargons

As a jargon grows in size and complexity, the need also grows for a specification of its expressions and the constraints that hold between them. Such a specification can be used to check existing documents, or can be employed in a syntax-directed editing environment to permit only the construction of legal documents. Note that this specification describes the configurations of expressions which may appear, but intentionally does not describe their denotations or types, which are resolved only with respect to a given task. At this time, we do not have a particular document specification language to propose. It is likely that different systems of constraints will be best served by their own unique "constraint jargons." An obvious first candidate is something along the lines of SGML Document Type Definition (DTD).

The complexity of the domain objects will determine the richness of the specification. In some simple information processing applications, nearly any mixture of expression and plaintext may be permissible (e.g., the banner jargon). For complex information, immediate dominance (ID) constraints which specify its structure may be the most prevalent. A text formatting markup jargon typically requires both immediate dominance and linear precedence (LP) constraints. For example, a book contains chapters which contain sections which contain subsections (ID constraints). The table of contents precedes the chapters which precede the references which precedes the index (LP constraints). Procedures in programming languages may have elaborate non-local constraints (e.g., scoping rule and declaration/use rules) in addition to more context-free syntactic formation rules. Existence constraints which govern the minimum and maximum number of appearances of a term, are another important class of constraints.

The Scalability of Documents

Large documents are not necessarily more complex than smaller ones, but they are apt to be. At one extreme is a database with many simple, identically structured records in it. Adding more records does not change the complexity of the database. On the other hand, a document such as this one, may start as a simple outline and end up as a complex document with subsections, footnotes, references, appendices, etc. To remain intellectually manageable, complex documents must be compositional and intuitive.

In a stream-oriented approach such as InfoWiz, the time to process the document will unavoidably grow as document size increases. The processing cost can be broken dawn into the cost of reading and parsing the document, and the cost of interpreting the expressions with a given set of actions. The cost of reading and parsing a document that will be reused many times in the same form can be amortized by saving the document in a machine-readable, parsed form. For some tasks, efficient indexing into the document structure can significantly reduce the processing time. One possible approach is to provide a multilevel access strategy for large documents. Suppose, for example that we have a query which tests for certain properties of an object, and that our document is a large collection of such objects. Rather than streaming through the entire database, we may be able to consult a pre-computed index to select a small subset of candidate objects, and then test only the selected objects exhaustively. This is similar to the approach we have taken in the searching utility glimpse, which combines coarse-grained inverted indexing with finegrained, run-time searching.

The Scalability of Task Definitions

Probably the hardest part about the infocentric paradigm is writing actions to define a task. To compound the difficulty, the benefit of information reuse is obtained only at the cost of defining new actions for each reuse. This means that the hardest part may be repeated many times. The saving grace is that writing actions is much easier than writing an equivalent program from seraph, especially for complex tasks. Several factors make actions easy to write:

the Wiz interpreter provides a stable and proven foundation for complex applications that eliminates much of the "churn" and uncertainty in the early stages of application development;

actions have a prescribed architecture and are limited to realizing the application-specific semantics of the task;

the infocentric paradigm affords a new approach to the divide-and-conquer strategy for managing application development; and the document and actions provide a complete, easily comprehensible picture of the computation that simplifies action development and debugging.

Further discussions of these factors follow.

Stable Foundation

From the standpoint of application development, InfoWiz eliminates two significant perils: syntax design, and interpreter writing. The syntax of an AOL designed from scratch tends to be volatile in the early stages as various paths are explored, found waning, and rejected in favor of new paths. This volatility wreaks havoc on early users. At some stage, the syntax must be frozen to prevent obsolescence of an ever increasing body of documents written in the AOL. Any subsequent demands for new syntactic "features" have to be satisfied by accretion rather than redesign. The result over the long run may be a syntax that is complex and incoherent. All of these problems are avoided with InfoWiz, because the WizTalk syntax is fully mature and stable, and is sufficiently flexible to accomodate new needs as they arise. This claim for flexibility can be made with confidence, because WizTalk syntax is a notation for function invocation and composition.

InfoWiz eliminates the question. "Is this an interpreter bug or a bug in my program?" because the Wiz interpreter has been proven over many jargons. In general, a bug in the interpreter or compiler of a general-purpose language is rare, because they are the archetype of reusable code tested by each program processed. By comparison, a special-purpose interpreter written from scratch is rife with bugs, because it is a complex program requiring expertise to write and understand, and has not been extensively tested. To make matters worse, as the ALL grows, its interpreter undergoes change, growing every bigger and more complex, and perhaps never stabilizing to a point where the question raised above can be confidently answered. Every change raises the possibility of breaking code that worked before. Not only is a special-purpose interpreter unstable and buggy, it is almost certain to lack debugging features, and hence can provide little help in helping us to find bugs in our code. With InfoWiz, we can be confident that the bug is in our actions, not in the InfoWiz interpreter, and its debugging features will help us find the bug. Furthermore, the clean separation between Wiz and our actions serves to isolate the impact of any bug in our actions to our task; or bug will not break wizers for other tasks.

Action Code

InfoWiz eliminates issue in developing an application; the design of the program architecture. With InfoWiz, the architecture is a given, and is simply a collection of actions. The architecture is also stable over the life of the jargon, so our program will never have to undergo a redesign of its architecture.

The compositional nature of WizTalk results in jargons with primitive expressions from which more complex expressions are built. The primitive expressions usually have simple semantics with correspondingly simple actions that are typically context-free and referentially transparent, so they can be composed without fear of hidden interactions. Primitive expressions with referentially transparent actions only interact with each other via their composition in a document, a fact that makes the interactions visible.

The complexity of actions varies widely. The simplest tasks lend themselves to a cooperative, context-free computational structure which reflects the document structure. In such cases, actions need not create explicit data structures to hold document structures and parameters, and the output product is directly synthesized as the document streams through the Wiz interpreter. But some tasks require that actions build intermediate data structures that other actions and functions can use to compute the product. While this approach may be necessary for tasks with no true locality (e.g., sorting), it is not the best fit to the datadriven nature of an InfoWiz processing.

Tasks whose actions produce a uniform type (e.g. strings or associative arrays) result in expressions that can be freely composed without fear of type incompatibility. But for tasks whose actions produce different—even context-dependent—data types, jargon usage is complicated by the need to avoid composing expressions with incompatible types. A possible solution is to introduce static typing into InfoWiz to insure that only type-compatible expressions are composed. However, static typing into InfoWiz to insure that only type-compatible expressions are composed. However, static typing just be flexible enough to allow a document to be processed with different sets of actions that yield different but self-consistent types.

Actions are automatically integrated into the customized interpreter, so there is no integration code to write, understand, and maintain. As the saying goes, "The best code is code we don't have to write." Without automatic integration, we would to have to study and understand a large body of application code in odder to integrate our new actions into the application. The effort to write a simple action would pale in comparison to the effort to integrate the action into a large application. And the entire system might break if the integration is done incorrectly. With automatic integration, the effort to extend a jargon amounts to writing the action code and nothing more. If the action is simple, the effort is commensurately small.

The scope of actions can be restricted to program modules called packages, which are named collections of wizers. By restricting the scope of actions to a specific package, we can specify which actions are visible during a span of processing by specifying which packages are active. In general, scoping of actions to packages gives us fine grain control over the interactions between major modules of a large jargon.

Divide and Conquer

The divide-and-conquer strategy for coping with complexity due to scale is given a new twist by InfoWiz. A complex problem can be divided into subproblems, a subjargon made to solve each subproblem, and then the subjargons pooled to solve the entire problem. Different developers can work fairly independently with modest coordination, because the nature of jargons assure that the subjargons will work together when pooled. Refinements can be made and incompatibilities resolved when the subjargons are pooled.

Our experience is that the multiple jargons manifestation of the divide and conquer strategy is often called for. For example, one problem required a jargon to represent a process as a finite state machine, a second jargon to represent the "objects" to be processed, and a third jargon to represent the messages that drove the process. By virtue of all the jargons being specializations of WizTalk and being processable by a common interpreter, it was easy to pool the jargons to realize the solution. Another example was a problem that required a jargon to represent an interactive telephone service, a second jargon to represent a simple database, a third jargon to represent a symbol table, and a fourth jargon to represent a mapping between keys and abstract events. Again, the ability to have a separate and distinct—yet poolable—jargons for subproblems of a large problem made the solution easy to achieve. These examples paint to the advantages of having a multiplicity of specialized jargons, each tailored to a part of the problem, rather than a single multipurpose language. Multiple jargons are only practical because each is so easy to make, and they work together.

Visualizable Computation

Developing and debugging a jargon is greatly facilitated by the fact that a jargon document is a surrogate for the execution trace of the computation that processes the document. The document shows which expressions are processed in which order (i.e., the control flow), and also shows the information that will be processed (i.e., the data values and data flow). By correlating the buggy output with the document, it's usually trivial to pinpoint the expression whose action is at fault.

Debugging is further facilitated by the one-to-one mapping between an expression and its action. When an expression produces the wrong result, the mapping makes it trivial to find the portion of the code—namely the action definition—that either contains the bug, or is the head of the trail that leads to the bug. The occurrence of the expression term in the action name makes it easy to search automatically for the action in a large body of code. The Wiz command also has an option to set a breakpoint in the action of an expression. When the breakpoint is encountered, the debugging facilities of FIT can be used to examine the action code, and to find the wizer containing the action.

Finally, it might be argued that the InfoWiz execution model which permits any combination of top-down and bottom-up evaluation of the expressions of a document is too powerful, and as a consequence, the reader cannot predict from the form of a document what will be the results of its processing. So in the abstract, a document succeeds in making the computation invisible, rather than visible as claimed, because the document neither embodies nor conveys any semantics whatsoever. This is necessarily so for information reuse. In the programming language community, the conventional wisdom is that this is a bad thing. We counter that the contract between the document author and the jargon maker is limited to the jargon specification, and is entirely silent about its semantics. Things usually don't go seriously awry because the task developer is obligated to write actions that are consistent with the jargon and its usage. This is no different from the requirement that conventional programs be given "correct" input. Upon being given a "correct" set of actions, it will be apparent from the document what the product will be. That a particular set of action bindings is necessary to understand the computation is not more an indictment of the infocentric paradigm than the fact that a particular set of variable binds is necessary to understand the computation of a conventional programming paradigm.

Related Work

InfoWiz comprises three major components: the WizTalk general-purpose information language, the Wiz base interpreter (and associated API functions), and the FIT general-purpose programming language The essence of InfoWiz lies in Wiz's processing model for documents, and the automatic integration of actions to realize the semantics of a jargon. WizTalk and FIT could be replaced with a number of alternatives while preserving the "infocentrism: of InfoWiz, just as the engine and transmission of an automobile can be replaced while preserving its essential "car-ness." We discuss below alternatives to these components, and thereby show the connection of InfoWiz with previous work. We also discuss precursors to the notions of jargons and the infocentric paradigm.

Alternatives to WizTalk

There is a rich legacy of programming languages and markup languages that could serve as a base language for jargons. The principle requirement of a base language is that it be capable of representing a mixed document, which is a mixture of plaintext and nested jargon expressions; an ancillary requirement is that the evaluation of nested expressions leaves all other aspects of the information intact.

The most obvious alternative to WizTalk is SGML (Goldfarb, 1990), a general-purpose information language for representing structured textual information. However, we feel that WizTalk makes a better base language. Compared to SGML. Wiz Talk is less verbose and easier to type (cf.; I [infowiz] versus <i>infowiz</I>); allows nested expressions in its notes (SGML does not allow nested expressions in its attribute values); is more readable for complex documents because of inset memos; has arrays and data structures; and lets the application decide whether to discard or retain indentations, has arrays and data structures; and lets the application decide whether to discard or retain indentations, newlines and blank lines. For many applications, these differences between SGML and WizTalk are not critical. What may prove critical in some applications is that SGML is a widespread and established standard, whereas WizTalk is a newcomer. For those applications, SGML could be substituted for WizTalk without less of generality. The substitution would entail changing the parser to understand the SGML syntax.

The TEX (Knuth, 1984) markup language and macro programming language could also be used as a base language for jargons. The TEX system even comes with a base interpreter that can be supplied with definitions of the semantics of new expressions that make up a jargon. TEX could be used in place of WizTalk, but we should avoid the mistake of misusing TEX as a replacement for FIT. Our experience is that one language cannot serve well as both an information and programming language. An information language has a simple syntax that permits mixed documents, and requires a top-down evaluation strategy, whereas a programming language typically has a much richer syntax and semantics for representing procedures, doesn't permit mixed documents, and works best with a bottom-up evaluation strategy.

The Tcl (Ousterhout, 1994) programming language is a means of representing arbitrary command languages, and by extension, structured information. Tcl is, however, ill-suited as an information language. The problem is that the Tcl interpreter fails to preserve the integrity of whitespaces in mixed documents. For example, x is set to a mixed document by % set x (one [expr 2] three)

Notice the double blank spaces between the words. When x is evaluated in order to evaluate the nested expression, each double blank spaces become a single black space % eval concat Sx % one 2 three This behavior precludes the use of Tcl as an information language.

Alternatives to FIT

Tcl, Lisp, or other programming languages could replace FIT as the language for writing actions. For reasons stated below, C and C++ would be poor replacements for FIT. (The Wiz interpreter must also be written in the same language to enable the interpreter and actions to interface easily with each other via the API functions.) The ideal action language is very high-level and interpreted, includes support for dynamic loading and context switching (to rebind the actions to expressions), provides dynamic allocation of strings and arrays (supported by automatic garbage collection), and is a good match paradigmatically for the kinds of tasks to be programmed. For the applications of interest to us, FIT's excellent string manipulation facilities, associative arrays (records) and debugging facilities make it a good choice as a programming language for actions.

Tools for Making Programming Languages

InfoWiz is a tool for making a programming language. Beginning with yacc, various tools have reduced the effort and skill required to make a programming language, but they require more expertise to use than InfoWiz. Tools such as yacc (Johnson & Sethi, 1990), MetaTool (Cleveland & Kintala, 1988; Anonymous, 1990), and A* (Ladd & Ramming, 1993) require that we design the syntax of the language, write a BNF grammar for the syntax, and write C code (Awk code in the case of A*) in order to realize the semantics of the language. These tools demand expertise in the design and implementation of programming languages, because they are essentially tools for making an interpreter for the programming language of interest. By contrast, Informs is much easier to use because it eliminates some of the hardest aspects of making a programming language with canned solutions: a prescribed syntax for the jargon, and a ready-made base interpreter. Furthermore, InfoWiz makes what is left to do—namely, writing actions—easier by providing a high-level programming language with a good programming environment for the purpose.

Precursors to Jargons and the Infocentric Paradigm

The backtalk (Greer & Belanger, 1993) system comes closest in spirit to InfoWiz as a realization of jargons and the infocentric paradigm. Greer and Belanger, inventors of backtalk, clearly anticipated jargons built on a base language > Backtalk has a built-in parser for a "universal" language. A wide variety of descriptive information can be captured easily by just this one language. [and] backtalk can read them in for processing without further ado. Backtalk can be used is so many different capacities precisely because so many different kinds of information can be represented in this common, somewhat universal data representation language. (Greer & Belanger, 1993, P. 27).

backtalk provides the BT general-purpose programming language for specifying the traversal of a parse tree, and as a high-level programming language for writing actions. BT also does double-duty as the base language for representing information, so like TEX, it suffers from the fact that one language cannot serve both purposes well. The ability to traverse the parse tree in any order, and to manipulate the tree make backtalk more flexible for applications where the default top-down, left-to-right traversal of InfoWiz is inappropriate. However, defining the semantics of a jargon is made more complex by the need for explicit specification of parse tree traversal and action invocation. It would be straightforward to achieve the same effect in InfoWiz by the addition of functions which explicitly manipulate the parse tree. For example, the following code would visit the parse tree nodes in reverse order:

WizMemo Reverse GetWizTree

Tcl also anticipated jargons

The entire Tcl "language" consists of about a half-dozen simple rules for parsing arguments and performing substitutions. The interpreter and its substitution rules are fixed, but new commands can be defined at any time and existing commands can be replaced. Tcl is powerful enough to allow a rich set of structures such as loops and procedures to be build as ordinary comments. Applications can extend Tcl not jut with new command but also with new control structures. (Ousterhout, 1994, p. 15–16):

However, Tcl suffers from some critical shortcomings as a realization of the infocentric paradigm. As mentioned earlier, Tcl is unsuitable for use as an information language because of its failure to preserve the integrity of mixed documents. Unlike backtalk, Ousterhout foresaw that the information language and the programming language should not be the same. Unfortunately, the programming language for writing actions for jargons made with Tcl was C, not a high-level interpreted language. As a consequence, most users of Tcl write actions in Tcl, and suffer the consequences of programming in a macro language.

The infocentric paradigm is modeled after the paradigm for markup languages such as toff and LaTex, but with a critical difference. The important advance of InfoWiz is that the language used to write actions is not the markup macro language, as is the case with toff and LaTex, but rather a separate procedural programming language. Actions define procedures, so it's best to use a procedural programming language designed specifically for representing procedures, rather than to "stretch" the base language with procedural extensions so that it can be used as a macro language for writing actions.

Our effort to contrast programming in the base macro language with programming in a real procedural programming language may sound academic and not of much practical consequence. This is far from the truth and reality. Macro languages have the unfortunate property of making simple things easy, but complex things virtually impossible. Macro languages typically lack features for managing the complexity of large programs such as scoped variables and functions, functions and object-oriented programming paradigms for programming at higher levels of abstraction, and most important, they lack a rich assortment of data types and data structures. Macro languages are also notoriously hard to debug, because the executing code often bears little resemblance to the written code. Unlike macro languages, high-level programming languages such as FIT can make complex things manageable; actions with supporting functions can run to hundreds, even thousands, of lines without running into problems of scale.

Naming: Information Reuse in Spreadsheets

In some ways, electronic spreadsheets representing and processing numerical information are another realization of the infocentric paradigm. A spreadsheet is a two-dimensional, tabular representation of (typically) numerical information. The spreadsheet uses (row, column) coordinates to locate information. The spreadsheet's use of a coordinate naming scheme rather than hierarchical nesting makes it simple for many different formulas to co-refer to the same information by specifying the same cell ranges. Naming permits an interesting reuse of information within the same document which can also be simulated in WizTalk in various ways. The most straightforward approach is to use WizTalk variables:

=x(111)[30] ;=x(112) [40] ;=x(113) [;# [; . x(111) +;.x (112)]]

Row 1 sum=;.x(113)

;=x(211) [50] ;=x(212) [60] ;=x(213) [;#[;.x(211) +;.x (212)]]

Row 2 sum= ;.x(2|3)

Processing this document yields this product:

Row 1 sum=70

Row 2 sum=110

Formulas like those in cells x(2|3) above typically apply some function (e.g., sum, difference, average) to values which refer to other cells or cell ranges. InfoWiz offers the additional flexibility of rebinding the formula actions to carry out alternative tasks. For example, the # action could be rebound to return the cell dependency relationships. In fact, InfoWiz variables can also capture expressions in raw form (unevaluated); by dynamically changing the binding environment, different computations can be performed using the same expressions during the same task.

We are not advocating InfoWiz as a replacement for spreadsheet programs. Spreadsheets are specialized representations for processing numerical, tabular data Spreadsheet programs are highly interactive, maintain dependency relationships, and automatically recalculate dependent quantities when changes are made. InfoWiz, as currently structured, utilizes a stream-oriented execution model. In principle, however, InfoWiz could also be cast in a more interactive, dependency framework.

Summary

The InfoWiz system comprises the WizTalk general-purpose information language, the FIT general-purpose programming language, and the Wiz base interpreter for Wiztalk. With the infocentric paradigm that ties them all together, it's easy to make an AOL or jargon for representing and solving problems in a domain. Jargons are members of a family of programming languages that share a common syntax, but differ in their expressions (and associated semantics). InfoWiz shows that computer languages we usually consider different—markup languages versus procedural programming languages, for example—are all closely related, and are in fact can be realized as jargons of a common base language. A jargon is in effect an application that puts the power of programming in the hands of end users with minimal programming skills, and enables the users to customize and extend the application. The shared features of jargons, their domain specificity, and their declarative character make them easy to learn and remember. Their common syntax and interpreter lets us pool existing jargons lo make a new jargon suitable for problems spanning multiple domains, each covered by one of the constituent jargons. Pooling suggests that large applications can be built as a collection of components, each dealing with a coherent chunk of the application, and collaborating with each other via a pooled jargon. The infocentric paradigm also makes practical the dream of SGML to reuse information by changing the expression semantics for each processing of a document to produce different products.

Although a specific embodiment of the invention has been disclosed, those skilled in the art will understand that modifications to the disclosed embodiment remain within the spirit and the scope of the invention.

What is claimed is:

1. A method for making a jargon application-oriented language to represent models of application domains and for processing the models, comprising:

providing an abstract syntax specification of jargons;

providing a host programming language for defining the semantics of jargons; and providing a base interpreter written in the host programming language and customizable with the semantics of a plurality of jargons.

2. A method for representing a domain model in a jargon application-oriented language and processing the domain model comprising:

making a jargon;

defining a semantics of the jargon;

representing a first domain model by writing a document in the jargon; and processing the first domain model with the base interpreter customized with a semantics of the jargon.

3. A method for representing a domain model in a jargon application-oriented language and processing the domain model of claim 2, wherein said making a jargon further comprises:

providing an abstract syntax specification of jargons; and preparing a set of expressions in accord with the abstract syntax specification, the expressions being suitable for representing domain models.

4. A method for representing a domain model in a jargon application-oriented language and processing the domain model of claim 3, wherein said defining a semantics of the jargon further comprises:

providing a host programming language; and preparing a wizer comprising a set of actions written in the host programing language, the actions corresponding to the expressions of the jargon and processing information associated with the expressions in a jargon document representing a domain model.

5. A method for representing a domain model in a jargon application-oriented language and processing the domain model of claim 4, wherein said processing the first domain model with the base interpreter customized with a semantics of the jargon further comprises the steps of:

providing a base interpreter written in the host programming language;

executing the base interpreter;

supplying a wizer to the executing base interpreter;

the executing base interpreter automatically customizing itself with a semantics of the jargon by integrating the actions of the wizer; and processing the first domain model by supplying the document representing the model to the executing customized interpreter.

6. A method for representing a domain model in a jargon application-oriented language and processing the domain model of claim 5, which further comprises:

repeating the steps of:

representing a next domain model by writing a document in the jargon; and processing the next domain model with the base interpreter customized with a semantics of the jargon;

until a plurality of domain models have been processed.

7. A method for representing a domain model in a plurality of jargon application-oriented languages and processing the domain model, comprising:

making a plurality of jargons;

defining a semantics of each of the plurality of jargons;

representing a first domain model by writing a document in a plurality of the jargons; and processing the first domain model with the base interpreter customized with a semantics of each of the plurality of jargons.

8. A method for representing a domain model in a plurality of jargon application-oriented languages and processing the domain model of claim 7, wherein said processing the first domain model with the base interpreter customized with a semantics of each of the plurality of jargons further comprises the steps of:

providing a base interpreter written in the host programming language;

executing the base interpreter;

supplying the plurality of wizers to the executing base interpreter, each wire comprising a set of actions written in a host programming language;

the executing base interpreter automatically customizing itself with a semantics of each of the plurality of jargons by integrating the actions of each wizer; and processing the first domain model by supplying the document representing the model to the executing customized interpreter.

9. A method for representing a domain model in a plurality of jargon application-oriented languages and processing the domain model of claim 8, which further comprises;

repeating the steps of:

representing a next domain model by writing a document in a plurality of the jargons; and processing the next domain model by supplying the document representing the model to the base interpreter customized with a semantics of each of the plurality of jargons;

until a plurality of domain models have been processed.

10. A method of representing a domain model in a jargon application-oriented language and processing the domain model multiple times to produce a plurality of products, comprising:

making a jargon;

defining a first semantics of the jargon;

representing a domain model by writing a document in the jargon; and processing the domain model with the base interpreter customized with the first semantics of the jargon to produce a first product.

11. A method for representing a domain model in a jargon application-oriented language and processing the domain model multiple times to produce a plurality of products of claim 10, wherein processing the domain model with the base interpreter customized with the first semantics of the jargon to produce the first product further comprises the steps of:

providing a base interpreter written in a host programming language;

executing the base interpreter;

supplying a wizer defining the first semantics of the jargon to the executing base interpreter, each wizer comprising a set of actions written in a host programming language;

the executing base interpreter automatically customizing itself with the first semantics of the jargon by integrating the actions of the wizer; and processing the domain model by supplying the document representing the model to the executing customized interpreter to produce the first product.

12. A method for representing a domain model in a jargon application-oriented language and processing the domain model multiple times to produce a plurality of products of claim 11, which further comprises:

repeating the steps of:
defining a next semantics of the jargon;
processing the domain model with the base interpreter customized with the next semantics of the jargon to produce a next product;
until the domain model has been processed with a plurality of semantics of the jargon to produce a plurality of products.

13. A method of augmenting every jargon application-oriented language with the capabilities of a base jargon, comprising:

making a base jargon, comprising the steps of:
providing an abstract syntax specification of jargons; and preparing a set of expressing in accord with the abstract syntax specification, the expressions being capable of modeling: programmatic variables, data structures including associative arrays, evaluation control, environments specifying the jargons whose semantics are defined, paths to search for input files and wizers, each wizer comprising a set of actions written in a host programming language, file input and output, and debugging aids;

providing every jargon with the capabilities of the base jargon comprising the steps of:
defining a semantics of the base jargon;
providing a base interpreter written in a host programming language;

enhancing the base interpreter with the semantics of the base jargon by integrating the actions of its wizer into the interpreter; and replacing the base interpreter with the enhanced interpreter.

14. A method of transforming a domain model expressed in a jargon application-oriented language into a data structure of the host programming language, comprising:

providing a host programming language;

writing a proxy action in the host programming language capable of transforming jargon expressions into components of a data structure in the host programming language;

providing a base interpreter written in the host programming language; and integrating the proxy action into the base interpreter so that during the processing of a jargon document, the proxy action defines the semantics of jargon expressions whose semantics are otherwise undefined because there is no action corresponding to the expressions in any wizer supplied to the interpreter.

15. A method for representing a domain model in a plurality of jargon application-oriented languages and processing the domain model multiple times to produce a plurality of products, comprising:

making a plurality of jargons;

defining a semantics of each of the plurality of jargons;

representing a first domain model by writing a document in a plurality of the jargons; and processing the first domain model with the base interpreter customized with a semantics of each of the plurality of jargons;

whereby a model written in a plurality of jargons can be processed multiple time with different semantics of each of the plurality of jargons to produce a plurality of different products.

16. A method for representing a domain model in a plurality of jargon application-oriented languages and processing the domain model, comprising:

making a plurality of jargons;

defining a semantics of each of the plurality of jargons;

representing a first domain model by writing a document in at least some of the plurality of the jargons; and processing the first domain model with the base interpreter customized with a semantics of each of at least some of the plurality of jargons.

* * * * *